Feb. 2, 1971 J. L. WALLACE, JR 3,560,941
MEMORY UNIT
Original Filed May 28, 1964
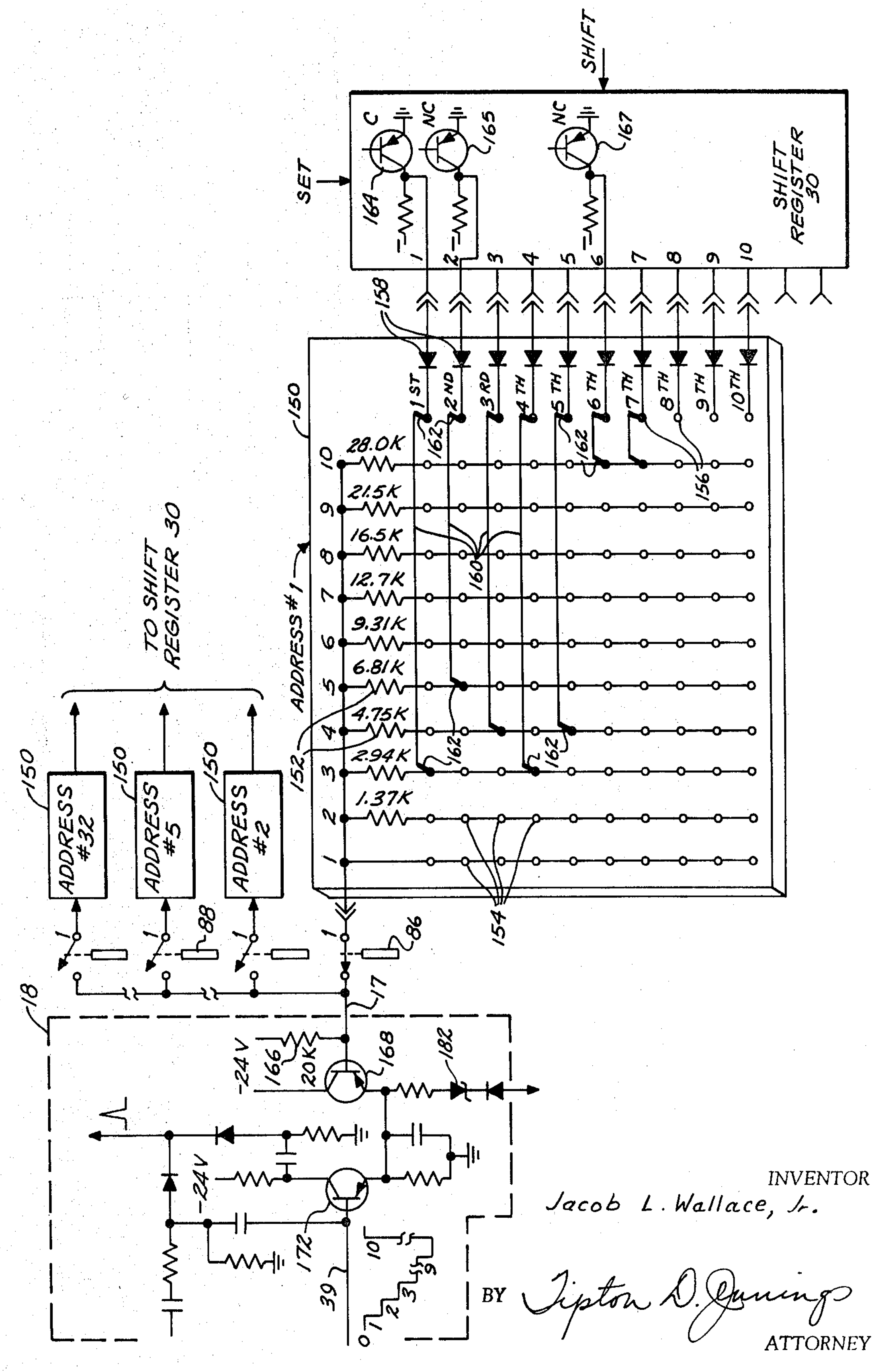
INVENTOR
Jacob L. Wallace, Jr.
BY Tipton D. Jennings
ATTORNEY 3,560,941
MEMORY UNIT Jacob L. Wallace, Jr., Springfield, Va., assignor to The Susquehanna Corporation, a corporation of Delaware Original application May 28, 1964, Ser. No. 370,780, now Patent No. 3,341,666, dated Sept. 12, 1967. Divided and this application Aug. 29, 1967, Ser. No. 664,084
Int. Cl. G11c *17/00*
U.S. Cl. 340—173 7 Claims

ABSTRACT OF THE DISCLOSURE

An embodiment of the present invention shows a circuit board used in the memory of a repertory dialer. The board has ten columns of electrically-connected sockets, each column being headed by a resistor weighted in value according to the column in which it is located. Each column corresponds to a digit value in an address. Ten rows, having a socket in each row, are also provided and correspond to the digit positions in an address. To program the circuit board, a wire lead is connected from the socket in each row to a socket in the column corresponding to the digit value. This board therefore permits the programming of information directly in analog form. The memory, comprising a plurality of boards, stores three-dimensional information in a two-dimensional matrix. The weighted resistors provide the third-dimensional information.

CROSS REFERENCE TO RELATED APPLICATIONS

This is a division of application Ser. No. 370,780, filed May 28, 1964, now U.S. Pat. 3,341,666, issued Sept. 12, 1967, the benefit of the disclosure of said application and its filing date being hereby expressly claimed.

BACKGROUND OF THE INVENTION

This invention relates, in general, to a programmable memory unit. One use for this memory unit is in a repertory dialer which automatically calls an address or telephone number without the necessity of manually selecting each digit of the address.

In the past, many approaches have been taken in the design of the repertories for repertory dialers. Some dialers use coded discs which rotate to produce pulses similar to dial pulses. Still others use a storage medium such as a drum or tape having magnetic patterns stored thereon which reproduce the dial pulses during readout. Another uses a plurality of wires selectively arranged in combination with the contacts of an electromechanical counter. During dialing, the counter advances in response to each dial pulse until a continuous electrical path is formed through a wire in the selected address which results in the termination of dialing of one digit in the address. This last design is shown in the U.S. Pat. No. 2,919,310.

SUMMARY

Briefly, the present invention is directed to a memory unit for storing information directly in analog form. The memory unit is readily programmed through the use of electrical circuit elements such as resistors. Each element has a specific electrical value, which in the case of resistance is in ohms. Programming of the memory is accomplished by utilizing those circuit elements whose values are the analogs of the digital information which it is desired to encode.

The present invention also enables the storage of three-dimensional information in a two-dimensional matrix. The third-dimensional information is obtained by connecting the electrical circuit elements at the crossover points for the column and rows of the matrix.

The programmable analog memory of the present invention enables the manufacture of a two-dimensional storage matrix having a single line output. During readout, the level of the output at this line is a discrete value as determined by one of the electrical elements in the memory unit.

Another advantage of the present invention is that a memory unit is provided which can be easily and quickly programmed by unskilled personnel. Another advantage is that the stored information in the memory unit can readily be altered or varied as desired.

Accordingly, an object of the present invention is to provide a memory unit which secures the advantages set forth above.

Another object of the present invention is to provide a memory unit which is readily programmed to encode an address and which can be used in forming the repertory of a repertory dialer.

Other objects and advantages will become apparent by a reading of the following description in conjunction with the sole accompanying drawing which shows the construction of a memory unit together with such additional circuitry as is necessary to aid in an understanding of the invention.

DESCRIPTION OF THE PREFERRED EMBODIMENT

The drawing demonstrates the cooperation between the comparator 18, selector relays, repertory, and shift register 30 of the repertory dialing systems described in the aforementioned patent application Ser. No. 370,780, now U.S. Pat. 3,341,666, which is hereby incorporated by reference. The repertory which provides the memory for the system can, as an example, contain thirty-two addresses 150, four of which are shown here. The address cards 150 are designed to be inserted or plugged into the repertory. As shown by Address #1, which is representative of the cards 150, one contact or terminal of each address card 150 is connected to contact 1 of a particular selector relay in a relay bank (not shown) while the contacts or terminals formed on the opposite side of the address cards 150 are commonly connected to a shift register 30.

From the contact connected to the selector relay, the cards 150 are formed with a bus line connected to ten columns, numbered 1 through 10, all of which except column 1 is headed by a resistor 152. Electrically connected in each column are ten sockets 154 which are aligned into ten rows, here designated at the right of the card as 1st through 10th. At the right of each row, formed in another column, are ten separate sockets 156 each of which is electrically connected to a diode 158.

Each address card 150 can be programmed to any desired telephone number. To this end there is provided a wire 160 having a pin 162 at each end. To program a digit of a telephone number one pin 162 of a wire 160 is inserted into a socket 156 on the row corresponding to the digit position, and the pin 162 at the other end of the wire 160 is inserted into a socket 154 where this same row intersects the column corresponding to the numerical value of the digit. For example, Address #1, which is programmed for 354–3400, shows that the first digit has a wire 160 extending from socket 156 of the first row over to the socket 154 in column number three which intersects the first row. Similarly, in the second row another wire 160 extends to column number five, and so on through the seventh row where the wire extends from its socket 156 to column number ten. In Address #1 the eighth, ninth, and tenth rows are not utilized.

From diodes 158 each numbered row of the Address card #1 is connected to a separate input of shift register 30. Each of the other address cards 150 is connected in the same manner. Accordingly, the first row of every address card is connected to the first position of shift register 30, the second row is connected to the second position, and so forth.

The comparator 18 compares the voltage level applied on line 39 to the base of transistor 172 with the voltage level applied on line 17 to the base of transistor 168. The level on line 39 is a staircase voltage which steps in response to the output of a conventional pulse generator (not shown). The level on line 17 for each comparison is fixed and is determined in part by one of the resistors 152 in the selected card 150.

If selector relay 86 is assumed to be actuated, contact 1 of this relay is closed and Address #1 in the repertory is selected. Initially, the shift register 30 is reset to the first position. Transistor 164 represents the first stage of the shift register and when the register is set in the first position, transistor 164 conducts. Diode 158 in the first row of Address card #1 is forward-biased. The remainder of the diodes 158 in this address card are reversed-biased since their associated transistors, as typically represented by transistors 165 and 167 in shift register 30, are nonconducting. With regard to the remaining address cards 150, none of their respective selector relays are energized and these cards have no effect on circuit operation during the dialing of Address #1.

With transistor 164 conducting, a conductive path exists from the negative supply through resistor 166 in comparator 18, line 17, contact 1 of selector relay 86, resistor 152 in the third column of address card #1, socket 154, pin 162, wire 160, pin 162 at the other end of this wire, socket 156 in the first row, forward-biased diode 158, to ground through conducting transistor 164 in shift register 30. With current flowing through this path, resistor 166, resistor 152 in column three, and the known minimal resistance of the conducting solid-state components form a voltage divider which applies a predetermined voltage level to the base of transistor 168.

Resistor 166 has a fixed value and the resistors 152 have a value based upon their column location. Appropriate resistance values are shown at the right of each resistor 152. The value of resistor 152 in column ten together with resistor 166 provides a voltage of about −14 volts at the base of transistor 168 in comparator 18. The resistance of resistor 152 in column nine causes this voltage to be approximately −12.5 volts. The value of resistor 152 in column 3 causes approximately −3.7 volts. The resistance at column one is chosen to be zero and no resistor is used. Therefore, if the digit has a numerical value of one the voltage on the base of transistor 168 will be just below ground potential, at about −.8 volt. This value is determined by the minimal resistance of a conducting diode 158 and a conducting transistor, such as transistor 164, of the shift register 30.

As just described, the numerical value of any digit in an address is determined by a resistance value. In other words, every digit in the address can be resistively encoded, resulting in a programmable resistive memory. Since resistance is used here as an analog of the digital (numerical) value, then in effect, there is provided a programmable analog memory unit, determinative solely by resistance.

For a complete description of how the comparator 18 utilizes the resistances 152 to control automatic dialing in a repertory dialer, your attention is invited to the aforementioned patent application Ser. No. 370,780, now U.S. Pat. 3,341,666. For the present, it is sufficient to state that the input to transistor 172 steps downwardly from zero volts until it reaches the voltage level established at line 17. At that time transistor 172 conducts and comparator 18 emits a positive spike to terminate dialing of one digit and initiate dialing of the next. Thus, for the first digit in selected Address #1, three input steps are applied to transistor 172 before comparator 18 fires, and, accordingly, three dial pulses are generated. Shortly thereafter, shift register 30 advances to its second position and ground is applied to the second row of Address #1. A new voltage level is applied on line 17 to the base of transistor 168, this time utilizing the resistor 152 in the fifth column of the address.

As the dialing of the address continues, the remaining rows in Address #1 are successively energized by shift register 30, applying in turn a voltage level as determined by the resistor 152 connected to the energized row by a wire 160. Since only a seven digit code has been programmed, the rows following the seventh are not connected. When the shift register energizes the eighth row, the absence of a connection to one of the columns causes 24 volts to be applied to transistor 168 in the comparator 18. Zener diode 182 conducts and the dialing sequence terminates as described in the aforementioned patent application Ser. No. 370,780, now U.S. Pat. 3,341,666.

As described previously, the arrangement of the cards 150 provides a programmable memory, resistive in design. Because each resistance value is chosen to be an analog of a numerical value, information is stored directly in analog form. The matrix arrangement of the columns and rows of the cards 150 also enables the storage of what can be termed three-dimensional information in a two-dimensional matrix. The columns of the matrix are commonly connected to the bus line which, as shown by Address #1, runs across the top of each card 150. These bus lines (and therefore the columns) are the first axis of the matrix and here provide the information as to the address, such as Address #1, Address #5, etc. The second axis of the matrix is formed by the bus lines in the rows of an address card which here provide the information as to the digit positions in an address, e.g., first digit, second digit, etc.

The value of each digit, which forms the third-dimensional information, is encoded without the necessity of incorporating a third axis into the matrix. This encoding or programming procedure, in which the wires 160 are inserted into the desired sockets 154 and 156, has been described previously. The step of inserting a wire between a column and a row in the matrix in effect connects a resistance 152 at the crossover point or intersection of a particular column and row. Because the resistance is an analog of digit value, this third-dimensional information is formed directly on the card. As described in the operation of the dialing sequence at which time readout of the stored information occurs, the output of a card 150 is taken from a single line because no scanning or similar processing of the matrix output is required, as would be necessary in a conventional matrix arrangement.

Although the memory unit of the present invention has been described with respect to a repertory dialer, it is obvious from an understanding of the invention that it can be used with other types of equipment. Furthermore, it is apparent that various modifications may be made by one skilled in the art without departing from the spirit and scope of the invention. Therefore, it is desired that only such limitations be placed on this invention as are imposed by the prior art and set forth in the appended claims.

What is claimed is:

1. A memory unit capable of being programmed to store information directly in analog form comprising a mounting board, a plurality of resistors each having a value of resistance representative of the information stored, said resistors being positioned on the mounting board in a plurality of columns with one resistor in each column, a plurality of sockets formed on the mounting board in each of said columns and electrically connected to the resistor in that column, a plurality of separate terminals for said board, and means for programming the memory unit for any desired read-out including electrical leads for detachably connecting the desired terminals to the sockets connected to those resistors whose resistance values are the desired analogs.

2. A memory unit as claimed in claim 1 wherein said terminals are arranged on said mounting board in a plurality of rows with a socket formed in each row, and said programming means connects said electrical leads into the sockets in the rows corresponding to the desired terminals.

3. A memory units as claimed in claim 1 wherein the resistor in each column has a discrete value of resistance which differs from the resistance value of the other resistors.

4. A memory unit as claimed in claim 3 further comprising an output terminal on said board electrically connected to each resistor.

5. A memory for storing analog information in a two-dimensional matrix, comprising a first plurality of electrically conductive bus lines representing the first axis of said matrix and a second plurality of electrically conductive bus lines representing the second axis of said matrix, a plurality of electrical elements of the same parameter, each element having an electrical value representative of the information stored, and means for connecting desired electrical elements between desired intersections of said first and second bus lines, the electrical value of said connected elements being the direct analog of third-dimensional information.

6. A memory as claimed in claim 5 in which the parameter of the electrical elements is resistance.

7. A memory as in claim 5 wherein the value of each element differs from the value of the other elements.

References Cited

UNITED STATES PATENTS

| | | | |
|---|---|---|---|
| 2,872,664 | 2/1959 | Minot | 340—173 |
| 3,310,778 | 3/1967 | Grundfest et al. | 340—166 |
| 3,393,449 | 7/1968 | Garcia | 340—173X |
| 3,428,954 | 2/1969 | David | 340—173 |
| 2,887,552 | 5/1959 | Lustig et al. | 340—166X |
| 2,902,607 | 9/1959 | Hedger et al. | 235—197X |
| 2,918,669 | 12/1959 | Klein | 340—166X |
| 3,245,051 | 4/1966 | Robb | 340—173 |

FOREIGN PATENTS

| | | | |
|---|---|---|---|
| 1,150,441 | 10/1958 | France | 340—173X |

TERRELL W. FEARS, Primary Examiner

U.S. Cl. X.R.

340—166